(12) United States Patent
Hendrix et al.

(10) Patent No.: US 11,466,963 B2
(45) Date of Patent: Oct. 11, 2022

(54) PROCESS FOR PRODUCING A POLYMER TAPE FROM A POWDER

(71) Applicant: DSM IP Assets B.V., Heerlen (NL)

(72) Inventors: Joke Hendrix, Echt (NL); Reinard Jozef Maria Steeman, Echt (NL); Nicholas Ryan Weaver, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 1062 days.

(21) Appl. No.: 16/065,266

(22) PCT Filed: Dec. 22, 2016

(86) PCT No.: PCT/EP2016/082325
§ 371 (c)(1),
(2) Date: Jun. 22, 2018

(87) PCT Pub. No.: WO2017/114736
PCT Pub. Date: Jul. 6, 2017

(65) Prior Publication Data
US 2021/0190461 A1    Jun. 24, 2021

Related U.S. Application Data

(60) Provisional application No. 62/271,404, filed on Dec. 28, 2015.

(51) Int. Cl.
| | |
|---|---|
| *F41H 5/04* | (2006.01) |
| *B29C 43/00* | (2006.01) |
| *B29C 55/00* | (2006.01) |
| *B29C 65/48* | (2006.01) |

(Continued)

(52) U.S. Cl.
CPC ......... *F41H 5/0457* (2013.01); *B29C 43/006* (2013.01); *B29C 55/005* (2013.01);
(Continued)

(58) Field of Classification Search
CPC ... F41H 5/0457; B29C 43/006; B29C 55/005; B29C 65/4815; B29K 2023/0683; B29K 2105/0094; B29L 2007/007
(Continued)

(56) References Cited

U.S. PATENT DOCUMENTS

| | | | |
|---|---|---|---|
| 3,658,978 A | * | 4/1972 | Ancker .................. B29C 48/001 264/175 |
| 5,628,946 A | | 5/1997 | Ward et al. |
| 2006/0142521 A1 | | 6/2006 | Rastogi et al. |

FOREIGN PATENT DOCUMENTS

| | | |
|---|---|---|
| EP | 0 191 306 | 3/1992 |
| EP | 0 504 954 | 9/1992 |

(Continued)

OTHER PUBLICATIONS

International Search Report for PCT/EP2016/082325 dated Mar. 13, 2017, 3 pages.
(Continued)

*Primary Examiner* — Samir Abdosh
(74) *Attorney, Agent, or Firm* — Nixon & Vanderhye P.C.

(57) ABSTRACT

The invention relates to a process for the production of a non-fibrous drawn polymer tape, said process comprising the steps: a) compacting a polymer powder in a press to form a compacted polymer bed; b) calendering said compacted polymer bed to form an oriented polymer tape; and c) drawing said oriented polymer tape to form a highly oriented polymer tape; characterized in that step a) comprises compacting the polymer powder at a temperature and pressure such that from 0.1 to 20 wt. % of the polymer powder as measured by DSC is melted. The invention also relates to a tape obtainable by the above process, and a monolayer, multilayered material sheet and ballistic resistant article comprising such a tape.

14 Claims, 1 Drawing Sheet

(51) Int. Cl.
*B29K 23/00* (2006.01)
*B29K 105/00* (2006.01)
*B29L 7/00* (2006.01)

(52) U.S. Cl.
CPC .. *B29C 65/4815* (2013.01); *B29K 2023/0683* (2013.01); *B29K 2105/0094* (2013.01); *B29L 2007/007* (2013.01)

(58) Field of Classification Search
USPC ........................................................ 89/36.02
See application file for complete search history.

(56)        References Cited

FOREIGN PATENT DOCUMENTS

| | | | | |
|---|---|---|---|---|
| EP | 0 683 374 | 7/1999 | | |
| EP | 1 144 740 | 10/2001 | | |
| KR | 20120018303 A | * 3/2012 | ........... | F41H 5/0485 |
| WO | 2001/021668 | 3/2001 | | |
| WO | 2006/002977 | 1/2006 | | |
| WO | WO-2009002374 A1 | * 12/2008 | ........... | B29C 43/228 |
| WO | 2009/002374 | 12/2009 | | |
| WO | 2009/153318 | 12/2009 | | |
| WO | 2010/007062 | 1/2010 | | |
| WO | WO 2010/112418 | 10/2010 | | |
| WO | 2013/131996 | 9/2013 | | |

OTHER PUBLICATIONS

Written Opinion of the ISA for PCT/EP2016/082325 dated Mar. 13, 2017, 5 pages.

* cited by examiner

PROCESS FOR PRODUCING A POLYMER TAPE FROM A POWDER

This application is the U.S. national phase of International Application No. PCT/EP2016/082325 filed Dec. 22, 2016, which designated the U.S. and claims benefit to U.S. Provisional Application No. 62/271,404 filed Dec. 28, 2015, the entire contents of each of which are hereby incorporated by reference.

The present invention relates to a process for producing a polymer tape by compacting a polymer powder in a press wherein a portion of the polymer is melted during compaction. The invention also relates to monolayer, a multilayered material sheet, and an anti-ballistic panel comprising said polymer tape.

Compacting polymer powders and drawing to form tapes is well-known. An example thereof is known from WO2009/153318 A1, wherein a process for compacting ultra-high molecular weight polyethylene using an isobaric press is described. WO2009/153318 A1 teaches that air must be removed to produce homogeneous tapes of high theoretical density. This removes faults in the tape which might hinder drawing. In particular, applying pressures of at least 6 MPa are taught to achieve tapes with high tensile strength. However, in order to maintain tensile strength it is critical that at no point during the processing of the polymer is its temperature raised to a value above its melting point.

It is a long-standing teaching in the prior art not to heat tapes above the melting point of the polymer powder from which they are made. It is in particular a problem when disentangled, or highly disentagled, polymers, for example ultra-high molecular weight polyethylene, are used. In those cases, melting causes the polymer chain to entangle, causing a rapid, irreversible increase in volume and reduction in density. The melted polymer may recrystallize on cooling but inhomogeneity in crystal structure will remain. This inhomogeneity causes the drawability of a tape comprising such entangled chains to be reduced.

A problem in the art is that compacted and drawn polymer tapes do not exhibit high adhesion to one another. Adhesion between adjacent layers of tapes is required for easy handling of a monolayer produced from said tapes. It is also beneficial in the production and performance of an anti-ballistic panel comprising a stack of monolayers of tape. In producing a conventional polymer tape, polymer powder has typically been compacted and drawn to form a relatively uniform tape, and will only form a strong bond to another tape if melted, or if a binder is used. However, melting is known to reduce the tensile strength of the produced tapes. This is undesirable in anti-ballistic applications.

WO2006/002977 A1 describes a flexible anti-ballistic assembly, wherein adjacent layers are connected at multiple spots over their surface by various methods, including stitching. When from 5 to 50 mass % of layers on the rear side of the assembly are connected, a reduction in back face deformation is found. WO2006/002977 A1 does not describe bonding adjacent layers through melting or partial melting of polymer tapes.

Typically, a binder is used to adhere tapes to one another. However, presence of a binder also has drawbacks. WO2013/131996 A1 describes a composite panel wherein adjacent layers of the panel have a plastomer applied as adhesive. The panel is formed by pressing layers under heat and pressure. It may be used as an anti-ballistic material. A disadvantage of such a panel is addition of the extra weight of the plastomer, which does not provide additional tensile strength. Accordingly, the energy absorption for a given weight of the panel is reduced. A further disadvantage of such a process is complication of the method of manufacture of the multilayered material sheet.

U.S. Pat. No. 5,628,946 describes a process for producing a polymer sheet wherein an assembly of fibers of oriented polymer are hot-compacted at a temperature such that a proportion of the material in the fibers melts. On cooling, this recrystallizes into a lower melting point phase which serves to bind the fibers together into a coherent polymer sheet. The core of the fibers remain intact. The sheet is accordingly formed by firstly producing strong fibers and then melting them so that they bond together. The minimum proportion required to be melted in order to achieve good bonding is 5%, preferably 10%. This amount is needed to fill the spaces between fibers upon compaction and hence produce a product which does not contain trapped air. The matrix may be melted again to bond adjacent polymer tapes in a multilayered material. A disadvantage of this process is that the melted portion of the fibers recrystallize in a different, non-chain extended crystal form, and therefore the fibers show a significant reduction in tensile strength.

The process of WO 2009/153318 like other known processes for compacting polymer powders has a reduced efficiency in achieving a homogeneous compaction of the polymer powder. It was further observed that the compacted polymer powders obtained with known processes show regions of lower density of compacted powder. Such lower density regions may affect in a deleterious way the mechanical properties of various products obtained by further processing the compacted polymer powder. For example they can cause cracking while drawing a polymer tape. Such cracking leads to weak spots or even breakages in the tape.

An aim of the invention may be to provide a polymer tape which shows the mentioned disadvantages to a lesser extent.

The present inventors have developed a process to produce a non-fibrous drawn polymer tape which does not show the above disadvantages. The tapes show good adhesion without the need for addition of a binder, or for melting, to form a bonding matrix. Accordingly, monolayers and multilayered material sheets comprising the tapes of the present invention may be produced easily. Further the tapes of the present invention show a reduced likelihood of crack formation. The tapes of the present invention have high tensile strength. Further, a ballistic resistant article comprising a tape of the present invention has a surprisingly high energy absorption, and a surprisingly low areal density relative to energy absorption.

Accordingly, the present invention provides a process for the production of a non-fibrous drawn polymer tape, said process comprising the steps:

a) compacting a polymer powder in a press to form a compacted polymer bed;
b) calendering said compacted polymer bed to form an oriented polymer tape; and
c) drawing said oriented polymer tape to form a highly oriented polymer tape;
characterized in that step a) comprises compacting the polymer powder at a temperature and pressure such that from 0.1 to 20 wt. % of the polymer powder as measured by DSC is melted.

The present invention further provides a non-fibrous drawn polymer tape obtainable by a process as defined above.

By tape is herein understood an elongated body having a length (L), width (W) and thickness (T), wherein the length is much larger than the width; and the width is much larger than the thickness. The tape may therefore be described as unidirectional, i.e. unidirectional in the direction of its length axis. The tape may have a cross sectional aspect ratio of at least 5:1, more preferably at least 20:1, even more preferably at least 100:1 and yet even more preferably at least 1000:1. By cross sectional aspect ratio is herein understood the ratio between the width of the tape, i.e. the largest distance between two points on the perimeter of the cross section of the tape, and its average thickness. The thickness of the tape is herein understood as the distance between two opposite points on the perimeter of the cross section, said two opposite points being chosen such that the distance between them is perpendicular on said width of the tape. By average thickness is herein understood the average of preferably at least 10 thickness values. The thickness of the tape can be measured for example from pictures taken with an optical or electronic microscope or with a micrometer or vernier caliper. The width can be measured by most conventional techniques, for example with a ruler or a tape measure or vernier caliper.

The width of the tapes preferably is more than 2 mm, more preferably more than 5 mm and most preferably more than 10, 20, 30, 50, 75 or 100 mm. The areal density of the tapes can be varied over a large range, for instance between 3 and 200 g/m$^2$. Preferred areal density is between 5 and 120 g/m$^2$, more preferred between 10 and 80 g/m$^2$ and most preferred between 15 and 60 g/m$^2$. In case the polymer of the tape is ultra-high molecular weight polyethylene (UHMWPE), the areal density is preferably less than 50 g/m$^2$.

As used herein a tape includes what is sometimes referred to in the prior art as a film or a fiber, but the skilled person would understand from the definition above to be a tape.

Non-fibrous means the tape itself is not comprised of fibers.

The tape is drawn, or stretched. Drawing serves to further orient the polymer molecules in the oriented tape to form a highly oriented tape. This increases the tenacity of the tape. In this respect the term highly oriented is relative to oriented. It means at least 1% more oriented; preferably at least 5% more oriented; more preferably at least 10% more oriented; most preferably at least 20% more oriented than the oriented tape. Orientation may be measured by any suitable spectroscopic technique.

Orientation is typically increased by drawing. The draw ratio of the drawing step is at least 1.01; preferably at least 1.05; more preferably at least 1.1; most preferably at least 1.2.

DSC is Differential Scanning calorimetry. DSC is determined according to DIN EN ISO 11357-3 with samples of 1-5 mg mass, nitrogen being purged at a rate of 50 ml min$^{-1}$ and heating (or heating-cooling-heating cycles) in the range 0 to 200° C. at a rate of 10K/min are applied.

The % melted polymer are calculated by comparing the DSC curve for polymer powder prior to compaction against that of a compacted powder bed, by the following procedure:
  i. Carrying out DSC of polymer powder
  ii. Carrying out DSC of compacted powder bed
  iii. Plotting curves of % melted material against temperature for i. and ii, normalized for 100% mass of each sample
  iv. Subtracting the curve of i. from the curve of ii. to give % difference in melted material
  v. Reading the % increase in material at the peak present below the melting temperature of the polymer powder. For ultra-high molecular weight polyethylene this increase typically occurs between 125 and 137° C.

One advantage of the present invention is that the polymer tapes produced show improved adhesion when consolidated to form a monolayer or in multilayered structures. Without being bound by any particular theory, an explanation for this effect is that the portion of polymer powder melted during formation of the tape recrystallizes in a form having a lower melting point, i.e. it is melt recrystallized. This small fraction of melt recrystallized polymer improves the compaction of the powder. Due to the drawing of the tape after the compaction, the negative effect of melting on the final mechanical properties, for example tensile strength and tensile modulus, of the tape is very limited. Consolidating tapes under conditions where the melt-recrystallized polymer is softened or melted but the remaining polymer powder remains intact means that the melt-recrystallized polymer bonds to an adjacent tape, while the remaining powder maintains the structure of the tape. Such bonding is relatively strong when two adjacent tapes are of identical polymer because the melt recrystallized polymer has good affinity for the bulk polymer of both adjacent tapes. In the prior art, tapes do not exhibit such melt-recrystallization, and this effect of increased adhesion without substantial loss of mechanical properties is not shown.

Improved adhesion between tapes means that monolayers may be easily formed from the tapes and handling thereof is improved. Further, less, or even no, binder is needed to produce multilayered material sheets from the monolayers. Ballistic resistant articles produced according to the invention have reduced mass for a given anti-ballistic performance, because they require less binder. When no binder is present, the production process is also simplified. The tapes may also show increased adhesion to other materials, such as those described below to produce a ballistic resistant article.

Compared with tapes of the prior art, higher temperatures may be applied in compaction of the polymer powder of the present invention. Therefore, for a given material, a lower pressure may be used. This is a further advantage of the present invention because at lower pressure equipment is more efficient and easier to operate and easier to maintain. Equipment may be built to a lower specification, so is lower cost.

Preferably from 0.2 to 10 wt. % of the polymer powder is melted as determined by DSC. More preferably from 0.5 to 5 wt. % of the polymer powder is melted. Most preferably from 1 to 4 wt. % of the polymer powder is melted.

By compacting a polymer powder is herein understood that the polymer powder is compacted or compressed, at elevated temperature, to form a compacted polymer bed. Typically, the polymer powder is compacted by temporarily retaining the polymer powder between the endless belts while conveying them. This may for instance be done by providing pressing platens and/or rollers or pressure cushions in connection with the endless belts. Preferably, the polymer powder is compacted in a double belt press.

Various presses can be used to carry out the compaction of polymer powders, for example an isochoric press or an isobaric press. A preferred isochoric or isobaric press is a double belt press, which is a press wherein the compaction of the polymer powder is carried out between two endless belts. By isobaric press is herein understood a press wherein the pressure applied to a bed of polymer powder is independent of the thickness distribution of said bed. This is in contrast with an isochoric press wherein the pressure applied to a bed of polymer powder varies with the thickness distribution of said bed.

A suitable isobaric press is described in WO2009/153318. Isobaric presses are commercially available, for example from Hymmen GmbH, Germany.

It should be noted that a press can comprise more than one compression zone, which compression zone may be operated at different pressures and different temperatures.

The compaction pressure exerted on the polymer powder should be sufficient to produce a homogeneous compacted polymer bed. Preferably, the polymer powder is compacted with a pressure of at least 0.2 MPa, more preferably of at least 1 MPa, even more preferably of at least 2 MPa and most preferably of at least 3 MPa.

The minimum pressure required to compact a bed of a particular polymer powder at a particular temperature may be determined by the skilled person by routine experimentation.

Preferably, the maximum pressure applied in compacting a polymer powder is 7 MPa; more preferably 6 MPa; yet more preferable 5 MPa; most preferably 4 MPa. The maximum pressure required to compact a bed of a particular polymer powder at a particular temperature may be determined by the skilled person by routine experimentation.

The compacting takes place at elevated temperature, such that partial melting of the polymer occurs. This temperature can be determined by experiment and depends amongst others on the pressure of compaction and the speed of the belt press.

The polymer powder is exposed to temperature and pressure for a residence time sufficient to bring about the required amount of melting. The skilled person will select an appropriate residence time depending on the other conditions.

After compaction, the compacted polymer bed is cooled, either actively or passively, to a temperature below the onset of melting temperature for all crystal forms present in the compacted polymer bed as determined by DSC. Cooling typically occurs while the polymer powder is still being pressed. For example, the temperature within a double belt press is lowered. Once the temperature is below the onset of melting temperature for all crystal forms present in the compacted polymer bed, the compacted polymer bed is physically stable.

By a compacted polymer bed is herein understood a polymer powder that has only been compacted into a cohesive material, i.e. without being further processed by e.g. roll-pressing and/or stretching. The compacted polymer bed may then be subjected to further processing steps such as roll-pressing and/or drawing or stretching.

Calendaring, or roll-pressing, the compacted polymer bed to form an oriented polymer tape, involves passing the compacted polymer bed through a pair of opposed rollers under pressure. The rollers may be at elevated temperature. The tape may be pre-heated, for example by use of a hot shoe, before entering the nip of the calendar. Calendaring is carried out at a temperature below the melting point of the compacted polymer bed. Calendaring is done in the direction of the length of the tape. Calendaring further orients the polymer chains in the length direction of the polymer tape. The polymer melt-recrystallized during compaction is also oriented but to a lesser degree than the polymer which did not melt during compaction. An oriented polymer tape is thereby formed. Typical conditions for calendaring may be selected by the person of skill in the art.

In the context of the present invention, an oriented polymer tape is a tape which has undergone an orientation step after powder compaction. It therefore excludes the polymer tape directly exiting the powder compaction step a). The orientation step defined in step b) of the process of the present invention is calendaring.

Drawing, or stretching, of the oriented polymer tape to form a highly oriented polymer tape may be carried out by means known in the art. Such means comprise tensile stretching on suitable drawing units, for example drawing units comprising single and multi-pass ovens, hot shoes and heated rollers. Drawing is uniaxial, in the length direction of the tape. Drawing is carried out at a temperature below the melting point of the polymer and preferably below the melting point of the melt-recrystallized polymer. To attain increased mechanical strength and stiffness, drawing may be carried out in multiple discontinuous steps. In case of the preferred polymer (ultra-high molecular weight polyethylene) tapes, drawing is typically carried out in a number of drawing steps. The first drawing step may for instance comprise drawing to a stretch factor of 3. Multiple drawing may typically result in a stretch factor of 9 for drawing temperatures up to 120° C., a stretch factor of 25 for drawing temperatures up to 140° C., and a stretch factor of 50 for drawing temperatures up to and above 150° C. By multiple drawing at increasing temperatures, stretch factors of about 50 and more may be reached. Drawing steps may be in-line, i.e. part of a continuous process, or off-line, i.e. part of a discontinuous process wherein the tape is wound up and unwound between process steps. The tape may be stored or transported between winding and unwinding.

Drawing results in high strength tapes, whereby for tapes of ultra-high molecular weight polyethylene, a tensile strength of 1.2 GPa to 3 GPa and more may easily be obtained. The highly oriented polymer tape produced in step c) is typically the non-fibrous drawn polymer tape of the present invention. Optionally however, the highly oriented polymer tape may be subjected to further process steps, for example coating with a binder, or other surface treatment. Any further process step may be on-line, i.e. part of a continuous process, or off-line, i.e. part of a discontinuous process wherein the tape is wound up and unwound between process steps.

A preferred polymer powder is a powder of polyolefin, more preferably a powder of polyethylene. Preferably, the polymer powder comprises ultra-high molecular weight polyethylene (UHMWPE). Preferably the UHMWPE powder has an intrinsic viscosity (IV) of preferably at least 2 dl/g, more preferably at least 3.5 dl/g; still more preferably at least 4 dl/g, most preferably at least 5 dl/g. Preferably the IV of said UHMWPE powder is at most 40 dl/g, more preferably at most 25 dl/g, more preferably at most 15 dl/g. Preferably, the UHMWPE has less than 1 side chain per 100 C atoms, more preferably less than 1 side chain per 300 C atoms. Preferably, the UHMWPE powder comprises polyethylene having an intrinsic viscosity greater than 5. Suitable methods for manufacturing polyethylenes can be found for example in WO 2001/021668 and US 2006/0142521. A particularly preferred UHMWPE powder is a powder of a highly disentangled UHMWPE obtainable according to a process using the conditions described in WO 2010/007062.

The unconstrained melting temperature of the preferred UHMWPE powder is from 138 to 145° C. This can easily be determined by the person skilled in the art, for example as the peak temperature of melting using DSC.

According to the process of the present invention, the polymer used is in a powder form. Preferably, the polymer powder comprises particles having an average particle size of up to 1000 μm. More preferably, the polymer powder comprises particles which have an average particle size of up to 500 μm, still more preferably of up to 300 μm. The average size of the particles is preferably at least 1 μm, more preferably at least 10 μm. The particle size distribution and thus the average size of the particles can be determined by a well-known method of laser diffraction (PSD, Sympatec Quixel) as follows: the polymer powder sample is dispersed into surfactant-containing water and treated ultrasonically for about 30 seconds to remove agglomerates or entanglements between different particles; the sample is pumped through a laser beam and the scattered light is detected; the amount of the scattered light is a measure of the particle size.

Preferably, the polymer powder has a bulk density determined in accordance with ASTM-D1895 of below 0.6 g/cm$^3$, more preferably of below 0.4 g/cm$^3$, most preferably below 0.3 g/cm$^3$. To improve the handling of the powder, preferably said polymer powder has a powder bulk density of at least 0.05 g/cm$^3$, more preferably of at least 0.1 g/cm$^3$.

Optionally, a powder carrier supports the polymer powder during compaction.

The advantage of tapes of the present invention is that they have very high tensile strength, so that they are in particular very suitable for use in lightweight ballistic-resistant articles. The high homogeneity of the tape, caused by partial melting during production leads to reduced cracking during drawing and therefore improved drawability. As tensile strength is related to draw ratio, the tapes have a higher tensile strength than could be predicted from the prior art. Preferably, the non-fibrous polymer tape of the present invention has a tensile strength of at least about 1 GPa, more preferably at least about 1.2 GPa, even more preferably at least about 1.5 GPa; yet more preferably at least about 2.0 GPa, and most preferably at least about 2.5 GPa. Preferably, the non-fibrous polymer tape of the present invention has a tensile modulus of at least 40 GPa; more preferably at least 60 GPa; most preferably at least 80 GPa.

The term binder refers to any material which is not the tape itself that binds or holds the non-fibrous polymer tapes together in a monolayer, or holds adjacent monolayers together in a multilayered material sheet or ballistic resistant article. The effect of the present invention is to reduce the amount of binder required; preferably to eliminate the requirement for binder in order to produce a physically stable monolayer or physically stable multi-layered material sheet. Nevertheless, in some applications it is desired to apply a binder. A binder may enclose the non-fibrous polymer tapes in their entirety or in part, such that the structure of the monolayer is retained during handling and manufacturing of preformed sheets. The binder may be applied in various forms and ways; for example as a film (by melting hereof at least partially covering the anti-ballistic fibers), as a transverse bonding strip or as transverse fibers (transverse with respect to unidirectional fibers), or by impregnating and/or embedding the non-fibrous polymer tapes with a matrix material, e.g. with a polymer melt, a solution or a dispersion of a polymeric material in a liquid. Preferably, if present, binder is homogeneously distributed over the entire surface of the monolayer, whereas a bonding strip or bonding fibers may be applied locally. Suitable binders are described in e.g. EP 0191306 B1, EP 0683374 B1 and EP 1144740 A1.

Preferably the monolayer comprises less than 8 wt. % binder; more preferably less than 6 wt. % binder; still more preferably less than 4 wt. %; yet more preferably less than 2 wt. % binder. Most preferably, the monolayer comprises no binder. Preferably the multilayered material sheet comprises less than 8 wt. % binder; more preferably less than 6 wt. % binder; still more preferably less than 4 wt. %; yet more preferably less than 2 wt. % binder. Most preferably, the multilayered material sheet does not comprise a binder.

When part of a ballistic resistant article, this results in the best ballistic performance for a given weight.

The tapes of the present invention are typically arranged into a monolayer. In the context of the present invention, the term monolayer refers to a layer comprising a plurality of non-fibrous drawn polymer tapes produced according to the process of the present invention and optionally a binder. Preferably a binder is absent. A monolayer may be woven or unwoven.

The present invention further provides a monolayer comprising a plurality of non-fibrous polymer tapes as defined above, wherein the plurality of non-fibrous polymer tapes are unidirectionally aligned. Adjacent tapes within the monolayer may partially overlap along at least part of their longitudinal edges, or they may abut along at least part of their longitudinal edges, or there may be a gap between their longitudinal edges. Preferably said tapes partially overlap along at least part of their longitudinal edges, or abut along at least part of their longitudinal edges. In this way, the thickness of the monolayer is greater than the thickness of a single tape. In one embodiment, tapes overlap each other such that when viewed in cross section of the length, they form a brick-like structure, such that the thickness of the monolayer is that of two tapes. Preferably, adjacent tapes abut along at least part of their longitudinal edges.

To form a monolayer, the tapes are aligned, either partially overlapping or abutting or with gaps between adjacent tapes. A substrate may be used in production of the unidirectionally aligned monolayer. A substrate is necessary if adjacent tapes of the monolayer have gaps between them. The monolayer is then consolidated under pressure, preferably at elevated temperature.

The present invention further provides a process for producing a monolayer, comprising arranging a plurality of non-fibrous drawn polymer tapes as defined above in parallel such that adjacent tapes partially overlap and consolidating said arrangement under pressure and at a temperature such that as determined by DSC at least a portion of the polymer melts.

The present invention further provides a monolayer comprising a plurality of non-fibrous polymer tapes as defined above, wherein the plurality of non-fibrous polymer tapes are woven. Weaving may be in any suitable pattern, for example plain weave, basket weave, twill weave or satin weave. Preferably plain weave is used. Preferably, the woven monolayer comprises non-fibrous drawn polymer tapes as both warp and weft. Due to the crossing of warp and weft, the monolayer has a thickness of two tapes. Equipment for weaving of polymer tapes is known in the art. The monolayer is then consolidated under pressure, preferably at elevated temperature.

The present invention further provides a process for producing a monolayer comprising arranging a plurality of non-fibrous drawn polymer tapes as defined above by weaving, and consolidating said arrangement under pressure and at a temperature such that as determined by DSC at least a portion of the polymer melts.

The drawn polymer tapes of the present invention have the advantage of increased adhesion over those of the prior art. In the absence of a binder, the adhesion is typically at least 10% greater than that shown by a comparative tape produced without melting of the polymer. More preferably the adhesion is at least 20%; more preferably more than 40%; still more preferably more than 80%; yet more preferably at least double; most preferable at least three times greater than that shown by a comparative tape produced without melting of the polymer.

Adhesion is typically measured by a peel test. Samples are placed in a tensile tester and a T-test is performed over a fixed length; of, for example 50 mm or 100 mm.

The peel test can be used to determine whether a portion of the polymer has melted during consolidation of tapes, monolayers or the multi-layered material sheet of the present invention. If an increase in adhesion is shown, compared with a comparative system in which tapes do not comprise melt-recrystallized polymer, then melting has occurred.

The present invention further provides a multilayered material sheet comprising a consolidated stack of monolayers as defined above.

The multilayered material sheet according to the invention preferably comprises at least 2 monolayers, preferably at least 4 monolayers, more preferably at least 6 monolayers, even more preferably at least 8 monolayers and most preferably at least 10 monolayers. Increasing the number of unidirectional monolayers in the multilayered material sheet of the invention simplifies the manufacture of articles from these material sheets, for instance antiballistic panels. Flexible antiballistic garments may advantageously be prepared by stacking between 4 and 8 monolayers according to the invention.

Where two adjacent monolayers in the multilayered material comprise unidirectionally aligned polymer tapes, the two monolayers are preferably oriented at an angle of from 45° to 135° from each other. Preferably adjacent monolayers are aligned at an angle of from 85° to 95° from each other; more preferably about 90°. Preferably, such arrangement occurs throughout the stack such that alternating layers in the stack have an orientation of about 0° and about 90°.

Preferably, the monolayers are off-set within the stack, meaning that regions of overlap or gaps in one monolayer are not superimposed upon another monolayer, when viewed perpendicular to the plane of the monolayers. In this way, areas of weakness of a monolayer are not superimposed on areas of weakness of other monolayers in the stack.

The stack of monolayers is consolidated under pressure at elevated temperature. The temperature is between the melting point of the melt recrystallized polymer and the melting point of the non-melted polymer of the tape. For UHMWPE, the temperature is preferably greater than 134° C.; more preferably greater than 136° C.; yet more preferably more than 138° C. For UHMWPE, the temperature is preferably less than 150° C.; more preferably less than 146° C.; yet more preferably less than 142° C. Preferably it is approximately 140° C. By consolidating the unidirectional monolayers they are sufficiently interconnected to each other, meaning that the unidirectional monolayers do not delaminate under normal use conditions such as e.g. at room temperature.

The present invention further comprises a process for producing a multilayered material sheet, comprising stacking a plurality of monolayers as defined above, and consolidating said stack of monolayers under pressure and at a temperature such that at least a portion as determined by DSC of the polymer melts. An alternative method for the preparation of a multilayered material sheet involves preparing the monolayers in-situ in the multi-layered material sheet. Said process comprises the steps of:

(a) providing a plurality of drawn ultra-high molecular weight polyethylene tapes according to the invention, aligned such that each tape is oriented in parallel to adjacent tapes, and whereby adjacent tapes partially overlap;
(b) positioning said plurality of drawn ultra-high molecular weight polyethylene tapes onto a substrate thereby forming a first unconsolidated monolayer;
(c) positioning a plurality of drawn ultra-high molecular weight polyethylene tapes according to the invention onto the first unconsolidated monolayer, thus forming a second unconsolidated monolayer, whereby the direction of the second unconsolidated monolayer makes an angle α with respect to the first; and
(d) consolidating the thus formed stack under pressure, preferably at an elevated temperature, to consolidate the monolayers thereof.

The multilayered material sheet according to the invention is particularly useful in manufacturing ballistic resistant articles, such as vests or armoured plates. Ballistic applications comprise applications with ballistic threat against projectiles of several kinds including against armor piercing, so-called AP bullets, improvised explosive devices and hard particles such as e.g. fragments and shrapnel.

The present invention further provides ballistic resistant article comprising a multilayered material sheet as defined above and a further sheet of material selected from steel, aluminum, magnesium, titanium, nickel, chromium, iron, and an alloy thereof; ceramic; glass; graphite; and a combination thereof. Particularly preferred is metal. In such case the metal in the metal sheet preferably has a melting point of at least 350° C., more preferably at least 500° C., most preferably at least 600° C. Suitable metals include aluminum, magnesium, titanium, copper, nickel, chromium, beryllium, iron and copper including their alloys as e.g. steel and stainless steel and alloys of aluminum with magnesium (so-called aluminum 5000 series), and alloys of aluminum with zinc and magnesium or with zinc, magnesium and copper (so-called aluminum 7000 series). In said alloys the amount of e.g. aluminum, magnesium, titanium and iron preferably is at least 50 wt %. Preferred metal sheets comprising aluminum, magnesium, titanium, nickel, chromium, beryllium, iron including their alloys. More preferably the metal sheet is based on aluminum, magnesium, titanium, nickel, chromium, iron and their alloys. This results in a light antiballistic article with a good durability. Although the further sheet of material may be positioned anywhere in the stack of monolayers, the preferred ballistic resistant article is characterized in that the further sheet of material is positioned at the outside of the stack of monolayers, most preferably at least at the strike face thereof.

The ballistic resistant article according to the invention typically comprises at least 2 monolayers, preferably at least 10 monolayers, more preferably at least 20 monolayers, even more preferably at least 40 monolayers and most preferably at least 80 monolayers.

The ballistic resistant article may be a panel, a bullet-proof vest or a shield.

A multilayered material sheet as defined above may also be used as an anti-ballistic material without the addition of a further sheet of material. A multilayered material sheet as defined above may also be used in other impact resistant applications, for example in a radome.

The invention also relates to a process for producing a ballistic resistant article comprising stacking a plurality of monolayers as defined above, together with a further sheet of material comprising a material selected from steel, aluminum, magnesium, titanium, nickel, chromium, iron, and an alloy thereof; ceramic; glass; graphite; and a combination thereof, and consolidating said stack under pressure and at a temperature such that as determined by DSC at least a portion of the polymer melts.

When a ballistic resistant article comprising monolayers of ultra-high molecular weight polyethylene is manufactured, typical compression temperatures range from 100 to 153° C., preferably from 120 to 140° C. Typical compression pressures range between 10 MPa to 30 MPa, preferably 12 MPa to 16 MPa, whereas compression times are typically between 40 to 180 minutes.

Consolidation for all processes described above may suitably be done in a hydraulic press. Consolidation is intended to mean that the monolayers are relatively firmly attached to one another to form a cohesive article. The temperature during consolidating generally is controlled through the temperature of the press. The pressure during consolidating preferably is at least 7 MPa, more preferably at least 15 MPa, even more preferably at least 20 MPa and most preferably at least 35 MPa. In this way a stiff antiballistic article is obtained. The optimum time for consolidation generally ranges from 5 to 120 minutes, depending on conditions such as temperature, pressure and part thickness and can be verified through routine experimentation.

In the event that curved antiballistic articles are to be produced it may be advantageous to first pre-shape the further sheet of material into the desired shape, followed by consolidating with the monolayers and/or multilayered material sheet.

Preferably, in order to attain a high ballistic resistance, cooling after consolidation at elevated temperature is carried out under pressure as well. Pressure is preferably maintained at least until the temperature is sufficiently low to prevent relaxation. This temperature can be established by one skilled in the art.

The invention will be further explained with the help of a FIGURE and examples without being however limited thereto.

EXAMPLES

Methods of Measurement

Figure 1:
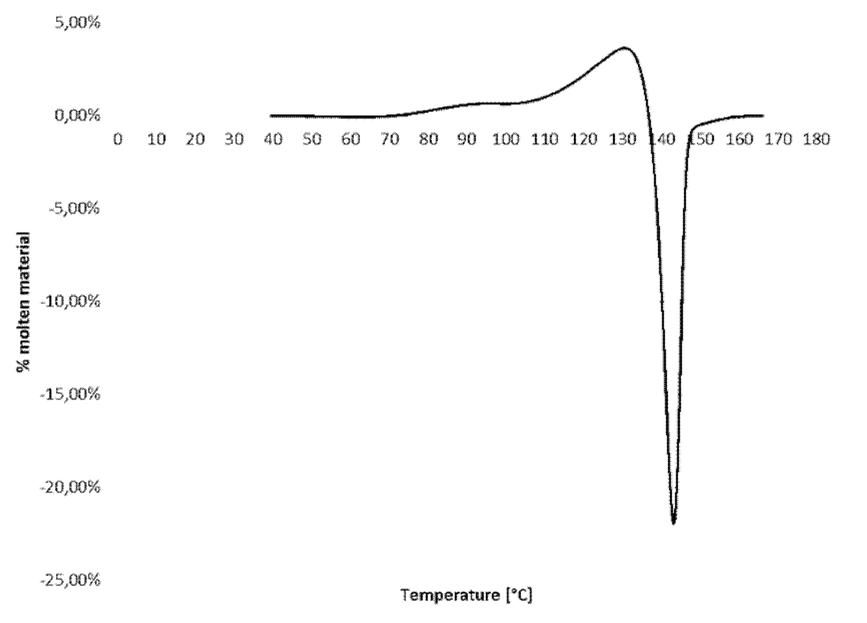
FIG. 1 shows a comparative DSC curve between UHMWPE powder prior to compaction and tape produced according to Example 1. Temperature is plotted on the X axis and % melted material is plotted on the Y axis. A peak at approximately 130° C. is shown at approximately 5% melted material.

Tensile properties, e.g. tensile strength and tensile modulus of the adhesive tape and of the tapes and of films according to this invention were defined from tensile testing. The width and thickness of the tapes were measured with a micrometer having an accuracy of 1 μm for the thickness and with a Vernier caliper with 100 μms accuracy for the width. The cross section area was obtained by multiplying width and thickness and expressed as square mm (mm²). Clamping was done in such a way that clamping damage was prevented, e.g. was done by draping the ends of the tapes around a circular bar, thus allowing load introduction by the capstan effect. The encircling around the circular bar was 180 degree and then the bar was clamped with mechanical means. A nominal gauge length of the tape of 440 mm and a crosshead speed of 50 mm/min were chosen. Tensile strength was obtained by measuring the breaking force, expressing it in newton and dividing that breaking force by the cross section area. The resulting breaking stress in $N/mm^2$ is identical to a stress expressed in MPa (1 MPa=1 $N/mm^2$). A modulus was obtained by adding reflective markers on the tape and measuring elongation (increase of distance between the markers) with optical means. The strain was then obtained by dividing the distance increase by the original distance. A modulus was obtained by dividing the stress difference by the according strain. Typically the modulus was obtained at a strain of about 0.15%, where initial setting of the specimens in the clamps and straightening was completed, but non-linearites occurring at higher strains were not yet present.

Intrinsic Viscosity (IV) is determined according to ASTM-D1601/2004 at 135° C. in decalin, the dissolution time being 16 hours, with DBPC as anti-oxidant in an amount of 2 g/l solution, by extrapolating the viscosity as measured at different concentrations to zero concentration. There are several empirical relations between IV and Mw, but such relation is highly dependent on molar mass distribution. Based on the equation $Mw=5.37*10^4 [IV]^{1.37}$ (see EP 0504954 A1) an IV of 4.5 dl/g would be equivalent to a Mw of about 422 kg/mol.

Differential Scanning calorimetry (DSC) was performed according to DIN EN ISO 11357-3 using standard heat flux DSC of Mettler Toledo. Samples of 1-5 mg mass were weighed with a precision balance and encapsulated in (crimped) aluminium pans of known mass. An identical empty pan was used as a reference. Nitrogen was purged at a rate of 50 ml min'. Heating-cooling-heating cycles in the range 0 to 200° C. at a rate of 10K/min were applied.

The % melted polymer was calculated by comparing the DSC curve for polymer powder prior to compacting against that of a compacted powder bed, by the following procedure:
i. Carrying out DSC of polymer powder prior to compaction
ii. Carrying out DSC of compacted powder bed
iii. Plotting curves of % melted material against temperature for i. and ii, normalized for 100% mass of each sample
iv. Subtracting the curve of i. from the curve of ii. to give % difference in melted material
v. Reading the % increase in material at the peak present below the melting temperature of the polymer powder.

For ultra-high molecular weight polyethylene powder, the polymer powder used in the examples, this peak occurs between 125 and 137° C.

Example 1

UHMWPE powder GUR2014 was obtained from Ticona, Germany. DSC was carried out on the powder as described in the method section.

A powder bed of UHMWPE powder was compacted in a double belt press at a pressure of 4 MPa and a temperature above 142° C. The aerial density of the powder bed was 1 kg per square meter. A sample of the compacted powder bed was subjected to DSC as described in the method section. The DSC curve was compared with the DSC curve for the polymer powder as described in the method section, and the % melted polymer was calculated. An increase in melted polymer of 5% was shown at the peak in the comparative DSC curve at approximately 130° C.

The resulting compacted polymer bed was compressed between two calendar rolls at a temperature of 135° C., to a thickness of 270 μm and subsequently was drawn with a factor 10 in an oven at 147° C. and then it was drawn again in another oven with a factor 2.5 at a temperature of 150° C. The resulting oriented tape had a thickness of 42 μms, a tensile strength of 1.7 GPa, a tensile modulus of 115 GPa and a width of 35 cm. The tape was slit to 2 mm in width.

Examples 2 and 3

A 25 cm length of 2 mm wide tape was laid on a metal plate of 25×30 cm covered with silicon paper. A second identical tape was laid on top such that 100% of the surface of the first tape was covered. Two such samples were prepared and consolidated under a pressure of 4 MPa and temperature of 127° C. for 15 minutes. The consolidated samples were removed.

Adhesion was measured by a peel test. Samples were placed in a tensile tester and a T-test was performed over a length of 100 mm. The tensile tester was a Zwick Z005, using 8253 2.5 kN clamps with 15 mm grip to grip and due to the curve 30 mm distance between the clamping contact points. The speed was 50 mm/min. The results are summarised in Table 1.

Comparative Experiments 1 and 2

Endumax® TA23 UHMWPE tape, Teijin, the Netherlands was purchased. The tape was produced by a process wherein, during compaction of the polymer powder bed no polymer in the powder bed was melted. A 25 cm length of 2 mm wide tape was laid on a metal plate of 25×30 cm covered with silicon paper. A second identical tape was laid on top such that 100% of the surface of the first tape was covered. Two such samples were prepared and consolidated separately under a pressure of 4 MPa and temperature of 127° C. for 15 minutes. The consolidated samples were removed and a peel test was conducted on each as described for Examples 2 and 3, as described in the method section. The average of the two results is 0.1 N. The results are summarised in Table 1.

TABLE 1

| Sample | % melted material at peak 125 to 137° C. by comparative DSC | Peeling Force (N) |
|---|---|---|
| Ex. 2 | 5 | 0.2273 |
| Ex. 3 | 5 | 0.2135 |
| Comp. Ex. 1 | 0 | 0.097 |
| Comp. Ex. 2 | 0 | 0.101 |

The results indicate that a tape produced according to the Examples, i.e. with 5% melting of the powder in the polymer powder bed as shown by DSC comparison with the polymer powder, has approximately double the adhesion of the tape of the Comparative Experiments, i.e. representing the prior art.

Comparative Experiment 3

UHMWPE powder GUR168 was obtained from Ticona, Germany. DSC was carried out on the powder as described in the method section.

A compacted polymer bed was produced by placing 15.6 g polymer powder in a 40*180 mm mould. The powder was placed in a Fontijne T1000 press wherein the temperature was increased over 30 minutes such that the temperature of the material was measured at 11TC, after which the press was closed and the material subjected to a pressure of 350 kN for 5 minutes. After pressing, the mould was cooled to 35° C. DSC was carried out on the compacted polymer bed as described in the method section. The % melted material was calculated by comparison with the DSC for the GUR168 polymer powder.

The compacted polymer bed was preheated to 130° C. for 3 minutes before being passed through calendars to produce a tape with a thickness of approximately 500 μm, retaining 40 mm width.

The Calendared tapes were cut into strips and two strips were placed with an overlap of 50 mm length. The thickness of the overlapped portion was measured and metal strips 50 μm thinner than the overlapped tapes was placed either side such that during pressing, only the overlapped portion is pressed. The overlap of the strips was pressed at 800 kN at 130° C. (preheating to 123° C.) for 60 minutes, then cooled under force to 50° C.

Adhesion was measured by a peel test. Samples were placed in a tensile tester and a T-test was performed over a length of 100 mm. The tensile tester was a Z1474-2, using 1 kN pneumatic grips, with a preload of 1 N and a speed of 5 mm/min. The results are summarised in Table 2.

Examples 4 and 5

Comparative Experiment 3 was repeated, except that that in the Fontijne T1000 press, the temperature of the material was measured at 128° C. (Example 4) and 138° C. (Example 5) rather than 11TC. % melted material for each Example was calculated in the same way as for Comparative Experiment 5. A peel test was for each Example was carried out the same way as for Comparative Experiment 5.

TABLE 2

| Sample | % melted material at peak 125 to 137° C. by comparative DSC | Peeling Force (N/mm²) |
|---|---|---|
| Ex. 4 | 0.43 | 0.03 |
| Ex. 5 | 2.56 | 0.14 |
| Comp. Ex. 3 | 0 | Fell apart - no adhesion measureable |

The results indicate that by applying higher temperatures during compaction of the polymer powder bed, a larger degree of melting occurs. As a result, the peeling force required to separate two strips of calendared material consolidated together also increases.

The invention claimed is:

1. A process for the production of a non-fibrous drawn polymer tape, said process comprising the steps:
    a) forming a compacted polymer bed by compacting a polymer powder which comprises ultra-high molecular weight polyethylene (UHMWPE) at a temperature and pressure such that from 1 to 20 wt. % of the polymer powder as measured by Differential Scanning Calorimetry (DSC) is melted;
    b) calendering said compacted polymer bed to form an oriented polymer tape; and
    c) drawing said oriented polymer tape to form a highly oriented polymer tape.

2. The process according to claim 1, wherein step a) is practiced such that from 1 to 5 wt. % of the polymer powder is melted.

3. The process according to claim 1, wherein the polymer powder is compacted in a double belt press.

4. The process according to claim 1, wherein the polymer powder comprises particles having an average particle size of up to 1000 μm.

5. The process according to claim 4, wherein the UHMWPE powder comprises polyethylene having an intrinsic viscosity greater than 5 dl/g.

6. A non-fibrous drawn polymer tape obtained by the process according to claim 1.

7. A monolayer comprising a plurality of uniaxially aligned non-fibrous polymer tapes, wherein each tape is the non-fibrous drawn polymer tape according to claim 6.

8. A monolayer comprising a plurality of woven non-fibrous polymer tapes, wherein each tape is the non-fibrous drawn polymer tape according to claim 6.

9. A multilayered material sheet comprising a consolidated stack of monolayers, wherein each monolayer is the monolayer according to claim 7.

10. A ballistic resistant article comprising a multilayered material sheet according to claim 9 and a further material sheet, wherein the material of the further material sheet is a metal or metal alloy selected from the group consisting of steel, aluminum, magnesium, titanium, nickel, chromium, and iron, and/or a non-metal selected from the group consisting of ceramic, glass, graphite, and combinations thereof.

11. A process for producing a monolayer comprising:
(i) forming a parallel arrangement of tapes by arranging a plurality of the non-fibrous drawn polymer tapes according to claim 6 in parallel such that adjacent tapes partially overlap; and
(ii) consolidating the parallel arrangement under pressure and at a temperature such that at least a portion of the polymer forming the tapes melts as determined by DSC.

12. A process for producing a monolayer comprising:
(i) forming a woven arrangement of tapes by weaving a plurality of the non-fibrous drawn polymer tapes according to claim 6; and
(ii) consolidating the woven arrangement of tapes under pressure and at a temperature such that at least a portion of the polymer forming the tapes melts as determined by DSC.

13. A process for producing a multilayered material sheet comprising:
(i) stacking a plurality of the monolayers according to claim 7, and
(ii) consolidating the stack of monolayers under pressure and at a temperature such that at least a portion of the polymer of the monolayers melts as determined by DSC.

14. A process for producing a ballistic resistant article comprising:
(i) stacking a plurality of the monolayers according to claim 7 together with a further material sheet, wherein the material of the further material sheet is a metal or metal alloy selected from the group consisting of steel, aluminum, magnesium, titanium, nickel, chromium, and iron, and/or a non-metal selected from the group consisting of ceramic, glass, graphite, and combinations thereof, and
(ii) consolidating the stack of the monolayers and further material sheet under pressure and at a temperature such that at least a portion of the polymer forming the monolayers melts as determined by DSC.

* * * * *